United States Patent
Matsunaga

(10) Patent No.: US 6,979,915 B2
(45) Date of Patent: Dec. 27, 2005

(54) PORTABLE EQUIPMENT WITH BACKUP BATTERY CHARGING FUNCTION

(75) Inventor: Toru Matsunaga, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/685,700

(22) Filed: Oct. 16, 2003

(65) Prior Publication Data

US 2005/0068006 A1    Mar. 31, 2005

(30) Foreign Application Priority Data

Oct. 18, 2002    (JP) .............................. 2002-304775

(51) Int. Cl.[7] .............................................. H02J 7/00
(52) U.S. Cl. ........................................ 307/66; 320/116
(58) Field of Search .............................. 320/135, 136, 320/116, 114; 307/64, 66

(56) References Cited

U.S. PATENT DOCUMENTS 5,666,041 A * 9/1997 Stuart et al. ................. 320/116

FOREIGN PATENT DOCUMENTS

| FR | 2298892 | * | 9/1976 |
|----|---------|---|--------|
| JP | 07273717 |  | 10/1995 |
| JP | 2001025161 | * | 1/2001 |
| JP | 2001051735 |  | 2/2001 |

OTHER PUBLICATIONS

JPO Computer Translation of JP-2001025161.*

* cited by examiner

Primary Examiner—Pia Tibbits
(74) Attorney, Agent, or Firm—Stevens, Davis, Miller & Mosher, LLP

(57) ABSTRACT

An object of the invention is to provide a backup battery charging circuit capable of continuing to charge a backup battery to the limit of the voltage drop of a main battery so as to reduce the possibility of data disappearance to an achievable extent. For this purpose, a backup battery charging circuit comprises: a main battery serving as a power supply; a backward current protection diode; a regulator circuit using the main battery as the power supply; a limiting resistor; a backup battery; a switch for performing direct charging from the main battery; and a comparator for determining whether the regulator circuit or the switch is to be used.

4 Claims, 4 Drawing Sheets

PORTABLE EQUIPMENT WITH BACKUP BATTERY CHARGING FUNCTION

BACKGROUND OF THE INVENTION

1. Field of the Invention

The present invention relates to a backup battery charging circuit for charging a backup battery used for the backup of data in a memory, a microcomputer, or clock function.

2. Related Art of the Invention

With recent spread of portable equipment, various apparatuses comprising clock function and the like require a backup battery for maintaining the necessary function even when a main battery serving as a power supply is removed and even when the voltage of the main battery goes lower.

When the main battery is removed and when the voltage of the main battery goes lower, the function of a charging current supply for the backup battery is lost. Thus, the voltage of the backup battery goes lower owing to the current consumption by a device that uses the backup battery as the power supply. When the voltage of the backup battery goes down to a certain voltage or lower, data disappears in the memory, the microcomputer, or the clock function that use the backup battery as the power supply. In order to reduce the possibility of such data disappearance, the backup battery is charged as much as possible during normal operation.

A backup battery charging circuit according to the prior art has configuration as shown in FIG. 2. In FIG. 2, numeral 1 indicates a main battery (such as a secondary battery) serving as a power supply. Numeral 2 indicates a backward current protection diode. Numeral 3 indicates a regulator circuit. Numeral 4 indicates a limiting resistor. Numeral 5 indicates a backup battery.

The operation of this backup battery charging circuit is described below. The regulator circuit 3 receiving the power in the form of the electric potential obtained as the voltage $V_{MB}$ of the main battery 1 minus the forward voltage $V_T$ of the backward current protection diode 2 supplies a charging current to the backup battery 5. The backward current protection diode 2 prevents a current from leaking from the backup battery 5 to the main battery 1 when the voltage of the main battery 1 goes lower. The limiting resistor 4 avoids an excessive charging current.

Since the withstand voltage of the backup battery 5 is lower than the voltage $V_{MB}$ of the main battery 1, the output voltage $V_{RG}$ of the regulator circuit 3 is set at a voltage not exceeding the withstand voltage of the backup battery 5.

Nevertheless, when the voltage $V_{MB}$ of the main battery 1 goes lower, the output voltage $V_{RG}$ of the regulator circuit 3 goes lower as shown in FIG. 4. FIG. 4 shows the electric potential obtained as the main battery voltage $V_{MB}$ minus the forward voltage $V_T$ of the backward current protection diode 2, the voltage $V_{BU}$ of the backup battery 5, and the output voltage $V_{RG}$ of the regulator circuit 3. The interval (1) indicates a backup battery charging interval.

At the time when the output voltage $V_{RG}$ of the regulator circuit 3 goes lower than the voltage $V_{BU}$ of the backup battery 5, the charging becomes impossible. After that, the electric charge in the backup battery 5 is continuously consumed by the memory, the microcomputer, or the clock function. This causes a possibility of data disappearance unless the backup battery 5 is recharged.

SUMMARY OF THE INVENTION

The invention has been devised in order to resolve above-mentioned problem in the prior art. An object of the invention is to provide a backup battery charging circuit capable of continuing to charge a backup battery to the limit of the voltage drop of a main battery so as to reduce the possibility of data disappearance to an achievable extent.

In order to achieve this object, a backup battery charging circuit according to the invention comprises: a main battery; a regulator circuit for receiving electric power from the main battery so as to supply a charging current to a backup battery; a direct charging circuit for supplying a charging current from the main battery to the backup battery without the intervention of the regulator circuit; and a mode determining means for determining an appropriate charging mode from the group consisting of a first charging mode where the charging current is supplied from the regulator circuit to the backup battery and a second charging mode where the charging current is supplied from the main battery to the backup battery without the intervention of the regulator circuit, so as to charge the backup battery.

This mode determining means selects the first charging mode, for example, when the voltage of the backup battery is lower than or equal to the output voltage of the regulator circuit, and selects the second charging mode when the voltage of the backup battery exceeds the output voltage of the regulator circuit.

As described above, the backup battery charging circuit according to the invention comprises the second charging mode in which the charging is performed directly from the main battery without the intervention of the regulator circuit and which is used when the voltage of the main battery goes lower, in addition to the first charging mode in which the charging is performed with the output voltage of the regulator circuit and which is used when the voltage of the main battery is high. Then, an appropriate charging mode is selected from the first charging mode and the second charging mode, so that the backup battery is charged. This permits the continuation of the charging of the backup battery to the limit of the voltage drop of the main battery, and hence permits efficient charging so as to reduce the possibility of data disappearance to an achievable extent.

More specifically, this backup battery charging-circuit comprises: a main battery serving as a power supply; a backward current protection diode; a regulator circuit using the main battery as the power supply; a limiting resistor; a backup battery; a switch (direct charging circuit) for performing direct charging from the main battery; and a comparator (mode determining means) for determining whether the regulator circuit or the switch is to be used.

The comparator compares the output voltage of the regulator circuit with the voltage of the backup battery, so as to perform charging from the output voltage of the regulator circuit when the voltage of the backup battery is lower than or equal to the output voltage of the regulator circuit, and perform direct charging from the main battery when the voltage of the backup battery exceeds the output voltage of the regulator circuit.

This configuration comprises the charging mode in which the charging is performed with the voltage of the main battery through the backward current protection diode to an achievable extent and which is used when the main battery voltage goes lower, in addition to the other charging mode in which the charging is performed with the output voltage of the regulator circuit and which is used when the voltage of the main battery is high. This permits efficient charging.

DETAILED DESCRIPTION OF THE INVENTION

An embodiment of the invention is described below in detail with reference to the drawings.

Figure 1:
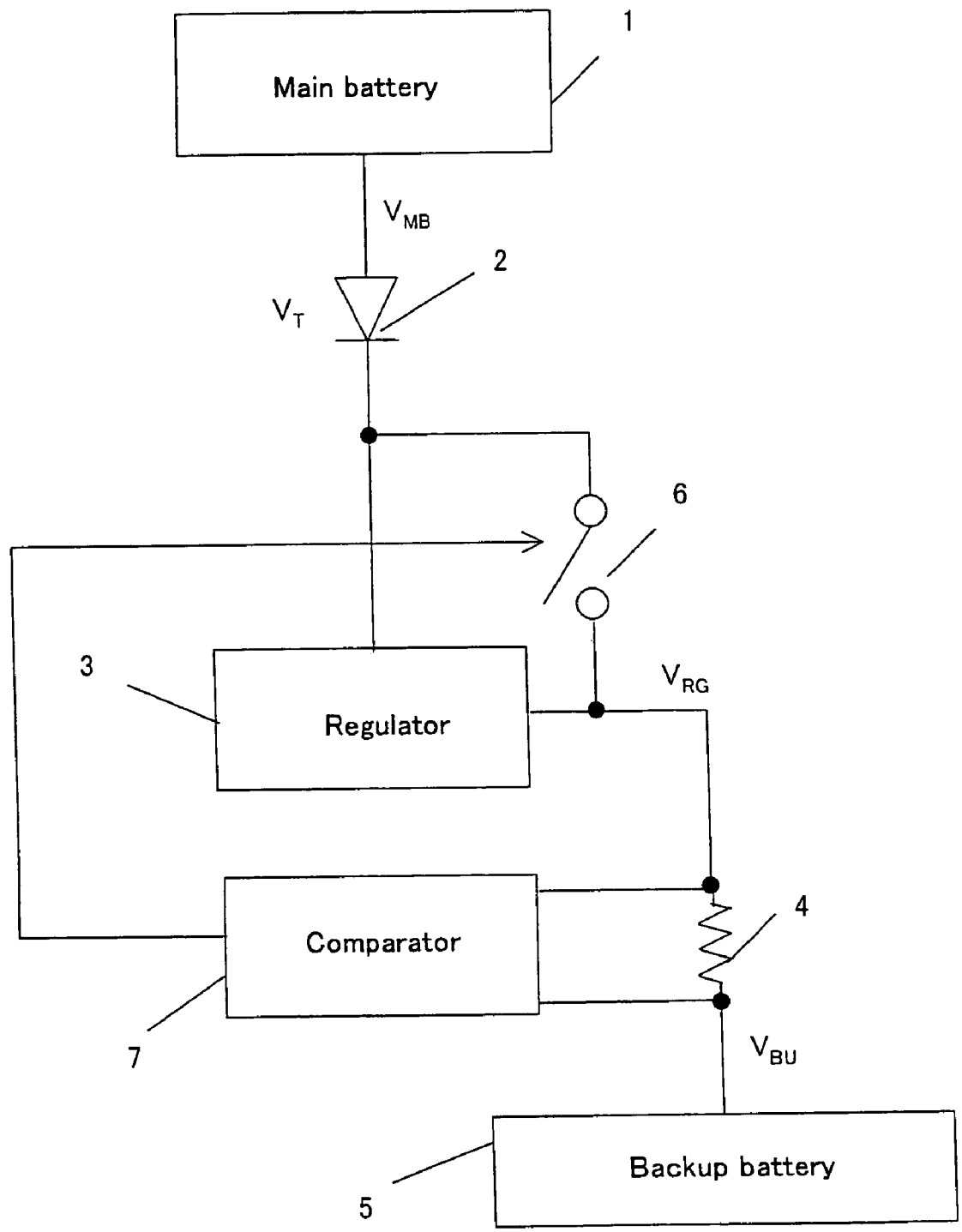
FIG. 1 is a block diagram showing the configuration of a backup battery charging circuit according to an embodiment of the invention.
Figure 2:
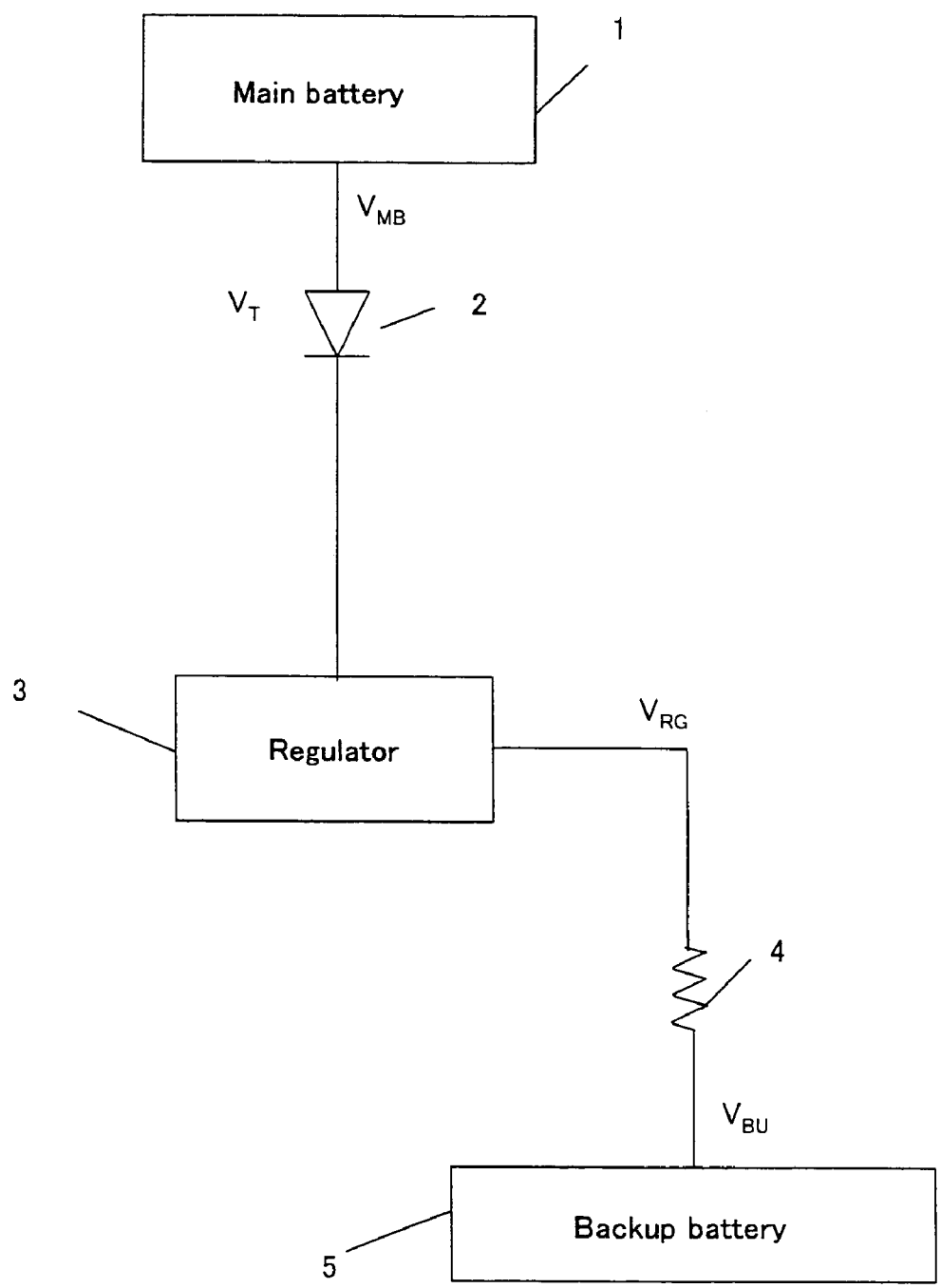
FIG. 2 is a block diagram showing the configuration of a backup battery charging circuit according to the prior art.

FIG. 1 is a block diagram showing the configuration of a backup battery charging circuit according to an embodiment of the invention. Here, components that correspond to those described in the prior art of FIG. 2 and that have essentially the same function as the described one are designated by the same numerals. In FIG. 1, numeral 1 indicates a main battery (such as a secondary battery). Numeral 2 indicates a backward current protection diode. Numeral 3 indicates a regulator circuit. Numeral 4 indicates a limiting resistor. Numeral 5 indicates a backup battery. Numeral 6 indicates a charging switch. Numeral 7 indicates a comparator.

The operation of the backup battery charging circuit according to this embodiment is described below with reference to FIG. 1.

When the voltage obtained as the voltage $V_{MB}$ of the main battery 1 minus the forward voltage $V_T$ of the backward current protection diode 2 is within a range permitting the operation of the regulator circuit 3 having a setting output voltage (for example, 3.0 V) that is determined with taking into account the withstand voltage of the backup battery 5, the backup battery 5 is charged to 3.0 V at maximum. At this time, the charging switch 6 is off.

When the voltage $V_{MB}$ of the main battery 1 goes lower, the supply voltage applied through the backward current protection diode 2 onto the regulator circuit 3 also goes lower. As a result, at the time point where the dynamic range has been narrowed to an extent that the setting voltage cannot be outputted, the output voltage $V_{RG}$ of the regulator circuit 3 begins to go lower. When the output voltage $V_{RG}$ of the regulator circuit 3 is greater than or equal to the voltage $V_{BU}$ of the backup battery 5, the backup battery charging-from the regulator circuit 3 is performed. Nevertheless, at the time when the output voltage $V_{RG}$ of the regulator circuit 3 goes lower than the voltage $V_{BU}$ of the backup battery 5, the backup battery charging from the regulator circuit 3 becomes impossible.

Figure 3:
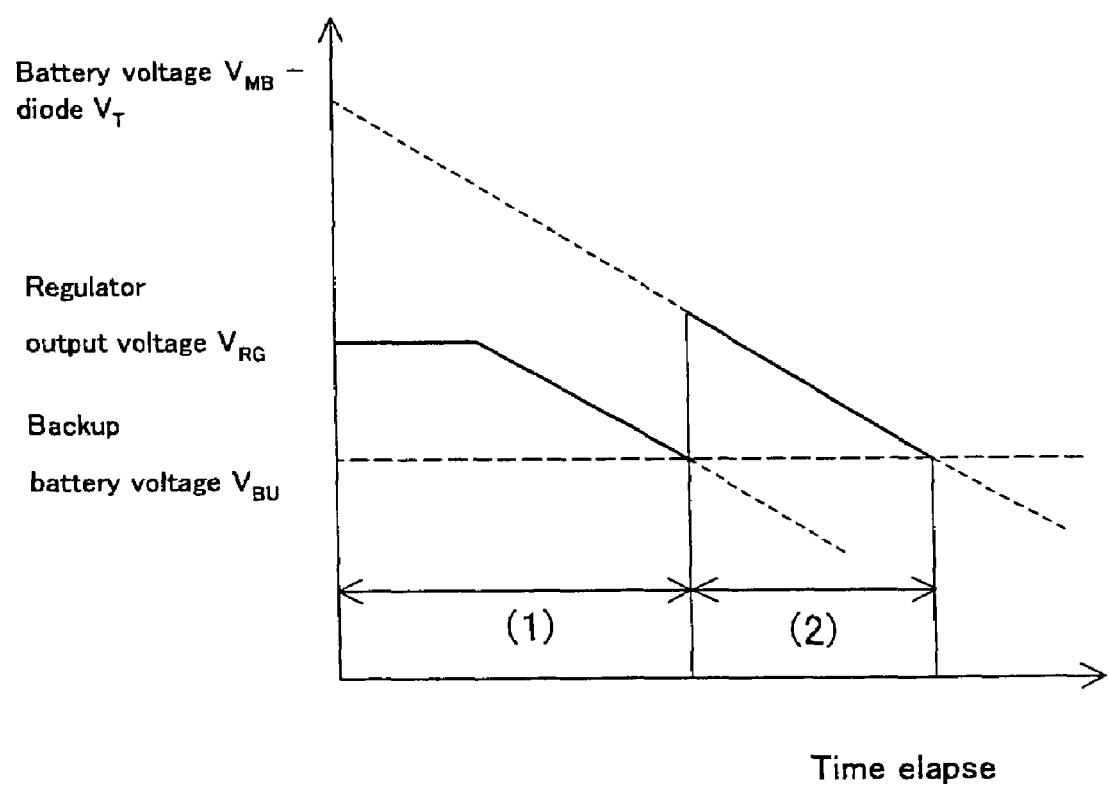
FIG. 3 is a characteristic diagram showing a backup battery charging characteristic according to an embodiment of the invention.
Figure 4:
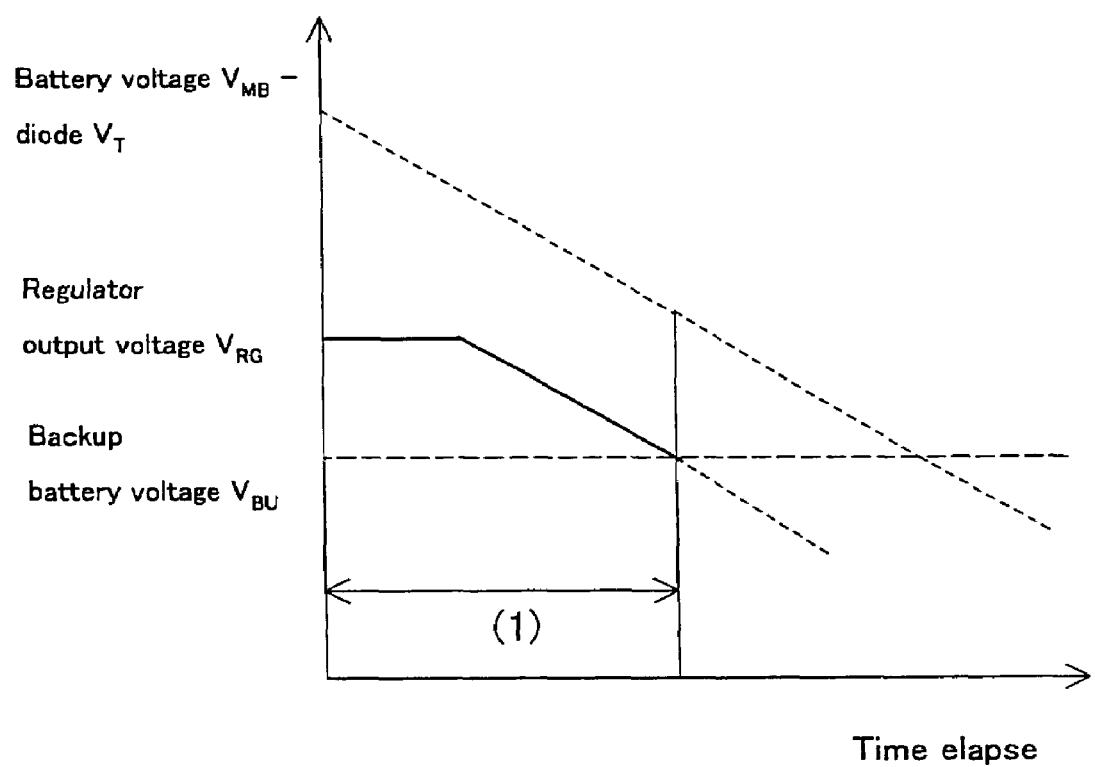
FIG. 4 is a characteristic diagram showing a backup battery charging characteristic according to the prior art of a backup battery charging circuit.

At this time, the comparator 7 compares the output voltage $V_{RG}$ of the regulator circuit 3 with the voltage $V_{BU}$ of the backup battery 5, so as to turn on the charging switch 6 when the output voltage $V_{RG}$ of the regulator circuit 3 goes lower than the voltage $V_{BU}$ of the backup battery 5. This permits the continuation of the charging with the voltage obtained as the voltage $V_{MB}$ of the main battery 1 minus the forward voltage $V_T$ of the backward current protection diode 2. This permits the continuation of the charging of the backup battery 5 to the limit of the voltage drop of the main battery 1, as shown in FIG. 3. FIG. 3 shows the electric potential obtained as the main battery voltage $V_{MB}$ minus the forward voltage $V_T$ of the backward current protection diode 2, the voltage $V_{BU}$ of the backup battery 5, and the output voltage $V_{RG}$ of the regulator circuit 3. The interval (1) indicates an interval of backup battery charging from the regulator circuit 3, while the interval (2) indicates an interval of backup battery charging through the charging switch 6.

For example, when the present voltage of the main battery 1 is 2.0 V, and when the forward voltage $V_T$ of the backward current protection diode 2 is 0.3 V, the backup battery 5 can be charged to a voltage of 1.7 V (2.0 V–0.3 V).

It should be noted that the charging mode using the charging switch 6 is performed in the interval where the voltage of the main battery 1 is low. Thus, this voltage does not exceed the withstand voltage of the backup battery 5.

What is claimed is:

1. A portable equipment including a backup battery charging circuit, said circuit comprising:
   a main battery;
   a regulator circuit for receiving electric power from said main battery so as to supply a charging current to a backup battery;
   a diode connected directly to said main battery, for preventing leakage of a current from said backup battery to said main battery;
   a direct charging circuit for supplying a charging current from said main battery to said backup battery without the intervention of said regulator circuit; and
   a charging mode determiner for determining an appropriate charging mode from the group consisting of a first charging mode, where the charging current is supplied through said regulator circuit to said backup battery, and a second charging mode, where the charging current is supplied from said main battery to said backup battery without the intervention of said regulator circuit, so as to charge said backup battery, wherein:
   said charging mode determiner compares the output voltage of said regulator circuit with the voltage of said backup battery, selects said first charging mode when the voltage of said backup battery is lower than or equal to the output voltage of said regulator circuit and selects said second charging mode when the voltage of said backup battery exceeds the output voltage of said regulator circuit.

2. The portable equipment according to claim 1, wherein said direct charging circuit includes a switch placed between said main battery and said backup battery, configured to connect said main battery directly to said backup battery during said second charging mode.

3. The portable equipment according to claim 2, wherein said charging mode determiner includes a comparator that inputs the output voltage of said regulator circuit and the voltage of said backup battery, the output signals of said comparator controlling the conducting and the blocking of current to said backup battery by said switch.

4. The portable equipment according to claim 3, wherein said comparator is connected to said switch, for turning on said switch during said second charging mode.

* * * * *